A. L. BLALOCK.
AUTO WHEEL.
APPLICATION FILED MAY 22, 1909.
969,593.
Patented Sept. 6, 1910.
3 SHEETS—SHEET 2.
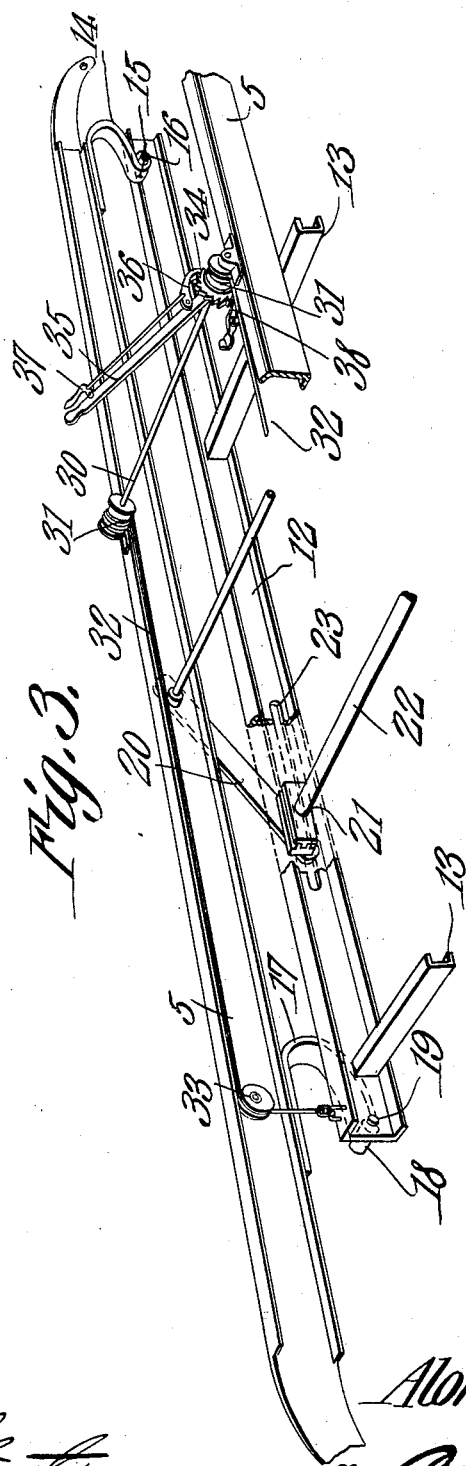
Witnesses
E. W. Stewart
H. G. Smith
Inventor
Alonzo L. Blalock.
By C. A. Snow & Co.
Attorneys

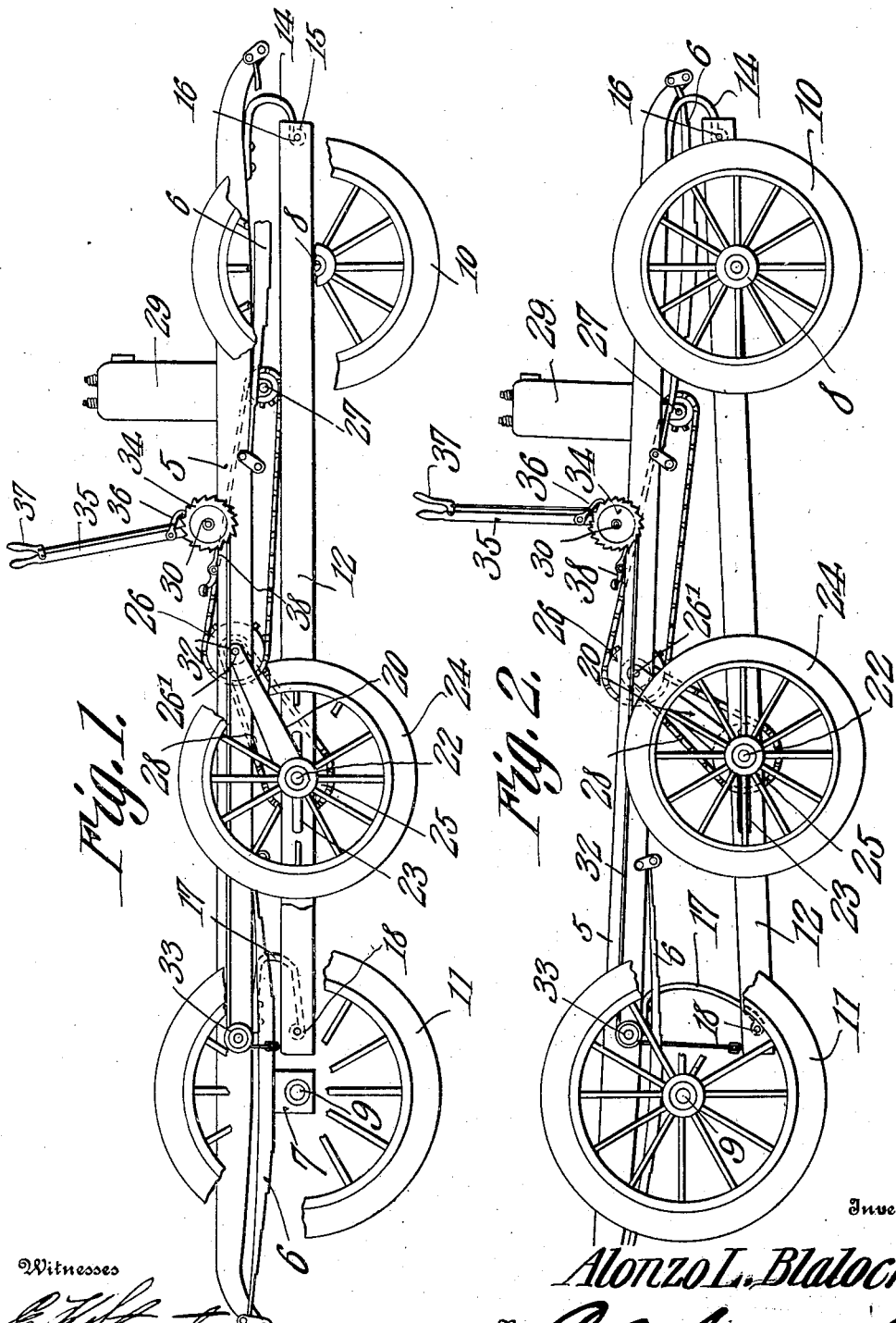

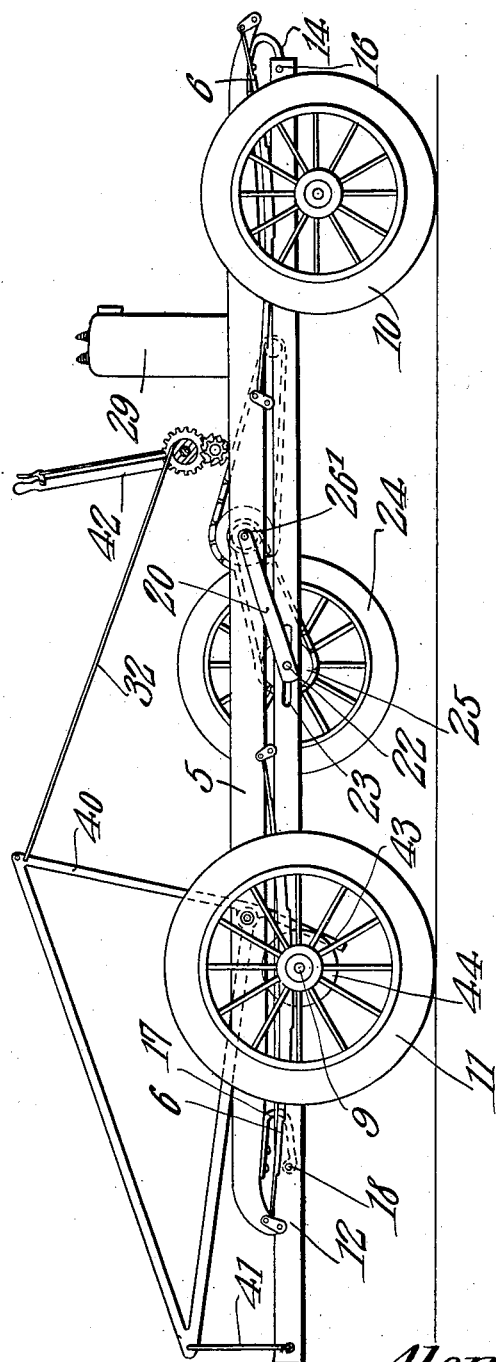

UNITED STATES PATENT OFFICE.

ALONZO L. BLALOCK, OF MADISON, FLORIDA.

AUTO-WHEEL.

969,593.

Specification of Letters Patent.

Patented Sept. 6, 1910.

Application filed May 22, 1909. Serial No. 497,702.

*To all whom it may concern:*

Be it known that I, ALONZO L. BLALOCK, a citizen of the United States, residing at Madison, in the county of Madison and State of Florida, have invented a new and useful Auto-Wheel, of which the following is a specification.

It is the object of the present invention to improve generally the construction of running gear for automobiles and similar vehicles.

A further object of the invention is to provide a construction of running gear for automobiles or similar vehicles which construction will obviate the employment of differential gearing in the running gear of vehicles of this class.

Another object of the invention is to provide a running gear for automobiles or the like embodying a traction element such as a traction wheel which, while it supports the rear portion of the vehicle, will permit of yield of this portion of the vehicle due to uneven roads and the like, and will at the same time remain at all times in engagement with the road surface regardless of its character.

In other words, it is one object of the invention to provide a running gear for automobiles or similar vehicles in which the traction member will remain at all times in engagement with the surface of the road whether the said surface be even or uneven.

Broadly speaking, the invention resides in the provision, in a vehicle, of a traction frame which is so mounted within the vehicle as to have a normal tendency toward movement to operative position, (that is to bring a traction element within the frame into engagement with the road surface) and means whereby the frame may be moved, at the will of the operator of the machine, to inoperative position.

In the accompanying drawings, Figure 1 is a side elevation, with parts broken away, of the chassis of an automobile showing the application of the invention thereto. Fig. 2 is a similar view but showing the traction frame in operative position, and Fig. 3 is a perspective view of a portion of the chassis and also a portion of the traction frame. Fig. 4 is a view similar to Fig. 1 but showing a slight modification of the invention.

In the drawings, there is shown an automobile chassis of which the side beams are indicated by the numeral 5, they being of the ordinary construction and supporting the usual springs 6 carrying the axle bearings 7 in which the axles are mounted, the front axle being indicated by the numeral 8 and the rear axle by the numeral 9, these axles supporting wheels 10 and 11 respectively.

As heretofore stated, a traction frame is mounted in the chassis of the vehicle and this traction frame comprises side beams 12 and connecting cross beams 13 and is supported from the chassis of the vehicle through the medium of springs as will now be described.

The springs for supporting the forward end of the traction frame are indicated by the numeral 14 and are illustrated as in the nature of bowed leaf springs secured each at one end to one beam 5 of the chassis and bowed forwardly with their lower ends extending rearwardly and provided with a barrel 15 which receives a stud or similar element 16 upon the corresponding side beam 12 of the traction frame, these springs 14 being so bowed and arranged as to yieldably support the forward end of the traction frame from the chassis without exerting an abnormal degree of downward pressure thereon. The rear end of the traction frame is supported by similar springs which are indicated by the numeral 17 and which are secured, as in the case of the springs 14, at their upper ends to the side beams 5 of the chassis of the vehicle and at their lower ends are provided each with a barrel 18 which receives a stud or similar element 19 carried by the respective side beam 12 of the traction frame. These springs 17, however, unlike the springs 14, tend normally to force the rear end of the traction frame in a downward direction for a purpose which will be presently explained and the degree of force exerted by these springs will be apparent from a comparison of Figs. 1 and 2 of the drawings, the springs being shown compressed in Fig. 1 and expanded in Fig. 2, in which latter instance the rear end of the traction frame is lowered to a considerable degree.

Before proceeding with a description of the means provided for controlling the traction frame or in other words for adjusting the same as regards its elevation at its rear end, the traction element which is mounted within the frame and which is provided for the purpose of propelling the vehicle, and the manner of mounting this element within the frame and of guiding the same, will first be described.

Pivotally suspended from each of the beams 5 at a point adjacent the rear end thereof is an arm 20 and these arms are provided each at its lower end with a bearing 21 in which bearings the ends of a shaft 22 are journaled, the said ends projecting through slots 23 formed in the beams 12. Upon the shaft 22 there is fixed a traction wheel 24 which may be either in the form of the ordinary rubber tired automobile wheel or of any other desired and suitable construction and there is also fixed upon this shaft a sprocket gear 25 around which and a similar gear 26 upon a counter-shaft 26' which is geared with an engine shaft 27, is trained a sprocket chain 28, there being an engine 29 mounted upon the chassis of the automobile and associated with the shaft 27 whereby to transmit power to the shaft 22 for the purpose of driving the wheel 24.

It will be understood of course that, as heretofore stated, the springs 17 act normally to force the rear end of the traction frame downwardly and that when so moved, the traction wheel 24 will be brought into engagement with the surface of the road bed and will, upon rotation, propel the machine forwardly and these springs 17 are of such strength as to sustain the weight of the rear portion of the car so that when the springs are permitted to expand in a manner which will hereinafter be explained, the traction wheel 24 is brought into engagement with the road bed surface and the rear wheels 11 of the automobile are raised clear of the said road bed, the vehicle being in this manner supported solely by the front wheel 10 and the traction wheel 24. It will further be understood that as the traction frame lowers, the arms 20 will be swung downwardly to lower the shaft 22 and the traction wheel carried thereby.

In order that the traction frame may be normally held in inoperative position or in other words in a position shown in Fig. 1 of the drawings there is provided a shaft 30 which is mounted upon the side beams 5 for rotation and carries, adjacent each end, a drum 31 with each of which is connected one end of a cable 32, these cables being led each rearwardly and over pulleys 33 and connected at their rear ends to the rear ends of the frame beams 12 of the traction frame. With the shaft 30, there is assembled a ratchet 34 and loosely mounted upon the shaft is a lever 35 which carries a pawl 36 coöperating with the ratchet 34, this pawl being adapted to be moved from engagement with the ratchet through the medium of a grip handle 37 mounted upon the lever 35. A foot operable dog 38 is mounted for transverse swinging movement upon one of the frame bars 5 and normally engages with the ratchet 34 whereby to hold the said ratchet against rotation in a direction to unwind the cable 32. It will now be understood that by forward and backward oscillation of the lever 35, the shaft 30 may be rotated in a direction to wind the cable 32 upon the respective drum 31 and that upon being so wound, the rear end of the traction frame will be elevated and the spring 17 will be compressed to about the position shown in Fig. 1 of the drawings. The springs 17 nevertheless exert their normal tendency to swing the rear end of the traction frame downwardly and it will hence be understood that should the lever 35 and hand grip lever 37 be grasped whereby to release or disengage the dog 36 from the ratchet 34, and then should the dog 38 be moved by the foot of the operator of the machine out of engagement with the ratchet 34, the traction frame will be forced downwardly by the springs 17 so as to bring the traction wheel 24 into engagement with the surface of the road bed and at the same time the rear end of the automobile will be elevated as regards the position of its rear wheels 11, the front wheels 10 of the automobile, however, remaining in engagement with the road bed.

From the foregoing description of the invention, it will be seen that there is provided a novel traction means for automobiles or the like which is so constructed and arranged as to permit of more ready turning of corners by the machine and that the invention presents numerous other advantages which will be appreciated by those operating automobiles.

In the form of the invention shown in Fig. 4 of the drawings, the cables 32 do not connect directly with the traction frame but are connected at their rear ends to one corner of a rocking frame 40 which is mounted upon the chassis of the vehicle near the rear thereof and which has connection at another corner, as at 41, with the rear end of the traction frame. In this form of the invention, there is provided a lever 42 which is identical in construction and arrangement with the lever 35 and is employed in winding up the cables 32 and thereby rocking the frame 40 whereby to raise or to permit lowering of the traction frame of the vehicle. At that corner of the frame 40 at which the pivot therefor is located, there are provided brake shoes 43 which contact with brake bands 44 upon the rear axle of the vehicle when the frame is rocked so as to raise the traction frame, it being understood that these brake shoes are not brought into engagement with the brake bands until the traction frame has been swung upwardly to such degree as to bring the traction wheel therein entirely out of engagement with the road surface and that thus by actuating the lever 42, the traction frame is not only moved to inoperative position but the brakes are simultaneously applied.

What is claimed is:—

1. In a vehicle, a frame including side members, a traction frame including side members, bowed springs connecting the forward ends of the side members of the vehicle frame and traction frame, bowed springs connected at their upper ends one to each of the side members of the vehicle frame and at their lower ends each to the rear end of one of the side members of the traction frame, the said last mentioned springs tending to lower said traction frame at its rear end and thereby elevate the rear of the vehicle frame and yieldably support the same, and means operable to elevate the said rear of the traction frame and hold the same in elevated position.

2. In a vehicle, a frame including side members, a traction frame including side members, springs connecting the forward ends of the side members of the vehicle frame and traction frame, bowed springs connecting at their upper ends one to each of the side members of the vehicle frame and at their lower ends each to the rear end of one of the side members of the traction frame, the said last mentioned springs tending to lower said traction frame at its rear end and thereby elevate the rear of the vehicle frame, and means operable to elevate and hold in elevated position the said rear of the traction frame, said means comprising a windlass, means for rotating the windlass, and a cable connected to and adapted to be wound upon the windlass and connected to the traction frame.

In testimony that I claim the foregoing as my own, I have hereto affixed my signature in the presence of two witnesses.

ALONZO L. BLALOCK.

Witnesses:
B. F. MOSELEY,
J. C. ARMSTRONG.